Dec. 26, 1939. F. M. SPURLOCK 2,184,901
GRASS SPRINKLER
Filed Sept. 8, 1938   2 Sheets-Sheet 2
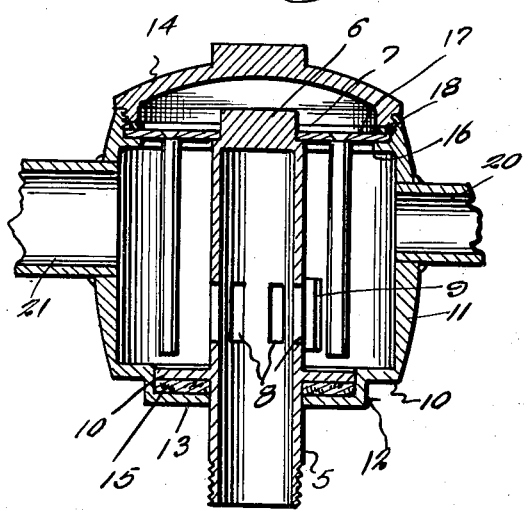
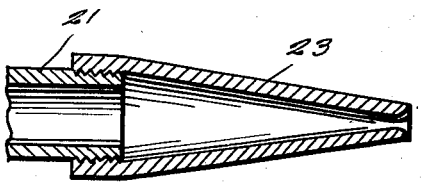
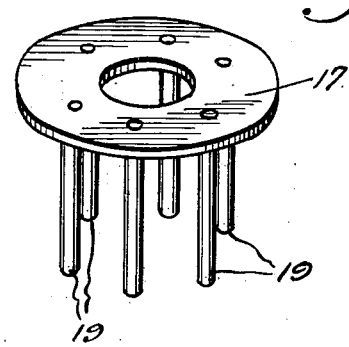
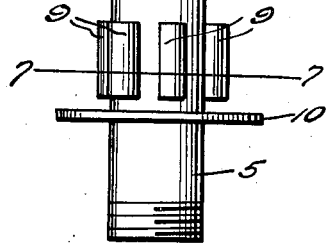
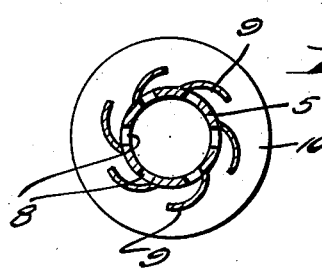
Inventor
Fred M. Spurlock
By Clarence A. O'Brien
and Hyman Berman
Attorneys Patented Dec. 26, 1939

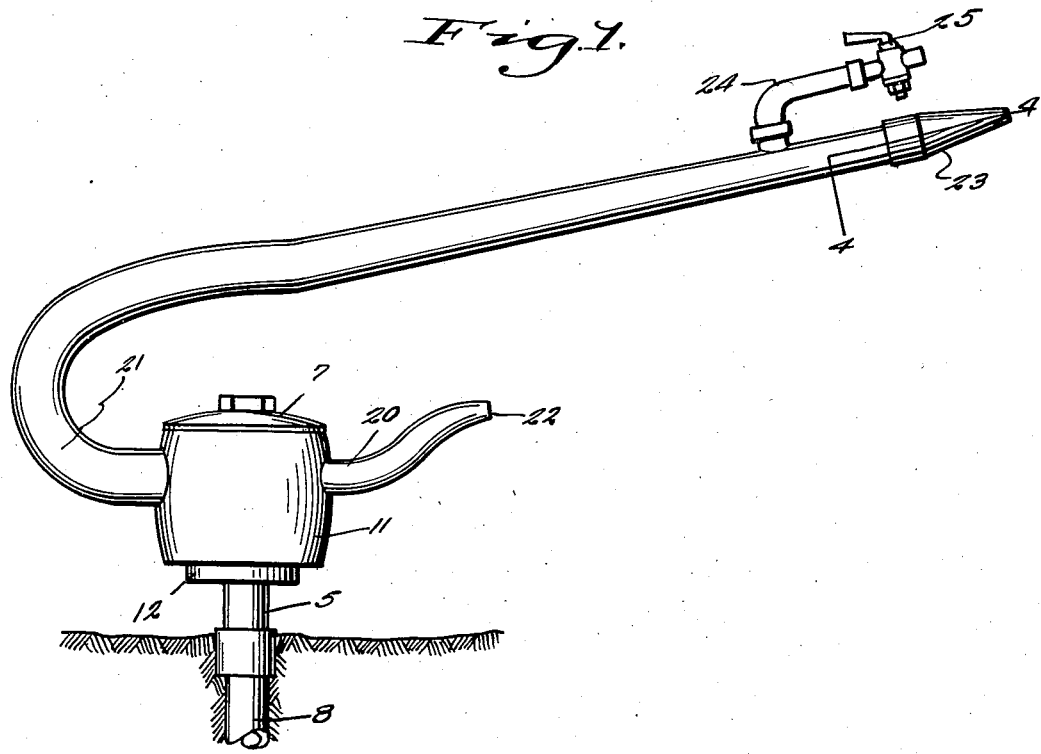
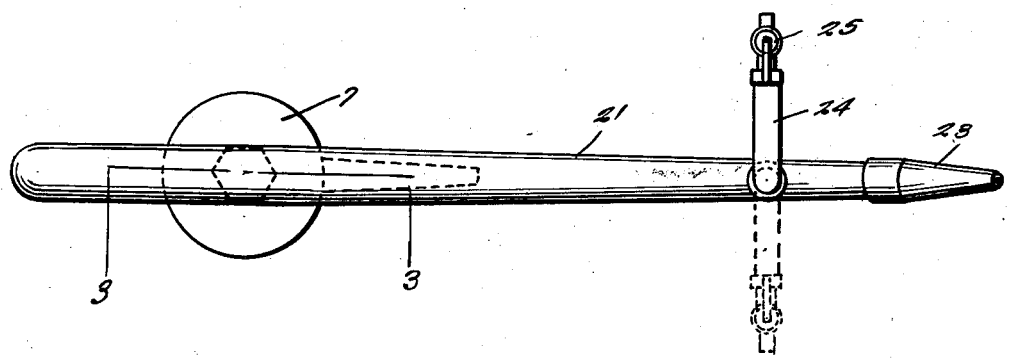

2,184,901

UNITED STATES PATENT OFFICE 2,184,901

GRASS SPRINKLER

Fred M. Spurlock, Pueblo, Colo.

Application September 8, 1938, Serial No. 229,016

2 Claims. (Cl. 299—69)

This invention relates to grass sprinklers of the rotary type, and has for the primary object the provision of a device of this character wherein the number of moving parts will be reduced to a minimum, consequently reducing wear and repairs incident thereto and which will efficiently sprinkle a large area as well as an area close thereto and which may have its speed of rotation easily varied and may be made to rotate right or left handed so that when in operation may be caused to rotate with the wind and thereby not be restricted in its sprinkling operation due to the wind blowing against the water discharge therefrom.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a grass sprinkler constructed in accordance with my invention.

Figure 2 is a top plan view illustrating the device.

Figure 3 is a detail sectional view taken on line 3—3 of Figure 2.

Figure 4 is a detail sectional view taken on line 4—4 of Figure 1.

Figure 5 is a perspective view illustrating the disk and the pins carried thereby.

Figure 6 is a side elevation illustrating the water distributing pipe.

Figure 7 is a sectional view taken on line 7—7 of Figure 6.

Referring in detail to the drawings, the numeral 5 indicates a water discharge pipe which has one end closed by an integral head 6 providing a shoulder or seat 7. The other end of the pipe 5 is screw threaded for connection with a water supply pipe 8. The water distributing pipe 5 is provided with a series of slots 8 through which the water may discharge and partially overlying said slots and forming an integral part of the pipe 5 are arcuately curved blades 9 which deflect the water as it leaves the slots 8' and causes the water to travel in a substantially circular path.

The water distributing pipe 5 adjacent the screw threads is provided with a bearing flange 10 and surrounding the pipe 5 and in spaced relation thereto is a barrel 11 having one end substantially closed by an end wall 12 provided with an offset portion 13 apertured to receive the pipe 5. The offset portion also contacts with the periphery of the flange 10 so as to rotatably support the barrel on the flange. The other end of the barrel is internally screw threaded and receives a closure cap 14 which overlies the closed end of the water discharge pipe 5. A gasket 15 is arranged in the offset portion 13 of the bottom wall 12 and contacts the flange 10 to prevent water from escaping from the barrel 11 about the water discharge pipe. The barrel 11 adjacent its internally screw threaded end is provided with an internal flange 16 forming a seat for an apertured plate 17. The plate engages the seat 7 and is rotatable thereon. The plate 17 is clamped onto the flange 16 by the closure cap 14. A suitable gasket 18 is positioned between the closure cap and the plate 17. A series of depending pins 19 are carried by the plate 17 and are grouped about the water distributing pipe so that as the streams of water escape from the distributing pipe by way of the slots 8' impinge against said pins 19 and this produces a smooth and steady movement to the barrel 11 and the parts carried thereby as the barrel is rotated by the flow of water from a pipe 24 on a discharge pipe 21 and when said pipe 24 is either in the position shown in full lines in Figure 2 or in dotted lines in said figure.

The barrel 11 is provided with oppositely arranged outlet ports in which are mounted water discharge pipes 20 and 21. The free end of the water discharge pipe 20 tapers into a nozzle 22. The length of the discharge pipe 20 is considerably shorter than the water discharge pipe 21 and has a compound curvature thereto, as clearly shown in Figure 1. The water discharge pipe 21 has a goose neck shape to a portion thereof and that portion is connected to one of the outlet ports of the barrel while the other end of the discharge pipe 21 has fitted thereto a nozzle 23. The above mentioned pipe 24 is rotatably connected to the water discharge pipe 21 adjacent the nozzle 23 and has connected thereto a control valve 25. By turning this pipe 24 to either the position shown in full lines in Figure 2 or to the dotted line position in said figure and opening the valve 25 the force of the water escaping from the pipe 24 will cause rotary movement of the device and the speed of rotation can be controlled by opening the valve 25 more or less. As soon as the valve is closed the device will stop. As before stated the pins 19 extending into the flow of water passing from the pipe 5 through the openings 8 and deflected by the blades or parts 9 will steady the device and cause a smooth motion thereof.

Due to the goose neck formation of the water discharge pipe 21 the nozzle carrying end thereof projects from the same side of the barrel as the water discharge pipe 20 but terminates at a considerable distance from the nozzle end 22 of the water discharge pipe so that the water discharging from the nozzle 23 will be sprayed over a comparatively large area at a distance from the barrel while the water discharged from the nozzle 22 will be over an area in close proximity to the barrel.

It is believed that the foregoing description, when taken in connection with the drawings will fully set forth the construction and advantages of my invention to those skilled in the art to which such a device relates so that further detailed description will not be required.

What is claimed is:

1. A grass sprinkler comprising a vertical water distributing pipe having a plurality of slots, arcuately curved blades formed on said pipe and partly overlying the slots for directing the streams of water from the slots in a substantially circular path, the upper end of said pipe being closed and said upper end having an annular shoulder thereon a barrel surrounding the pipe and including an apertured end wall to receive the pipe, a flange on the pipe and engageable with the apertured end wall, packing between the end wall and the flange, a closure cap for the other end of the barrel, an internal shoulder formed on said barrel to provide a seat, a plate rotatably supported by the annular shoulder of the pipe and clamped on the seat by the closure cap, a plurality of pins depending from the plate to be engaged by the streams of water escaping from the pipe by way of the slots for steadying the barrel during rotary movement thereof, a water discharge pipe connected with the barrel and adjustable means carried by said discharge pipe for discharging water therefrom in either one of two directions for causing rotary movement of the barrel and the parts carried thereby in either one direction or the other.

2. A grass sprinkler comprising a water distributing pipe having a plurality of slots, a barrel rotatably supported on the distributing pipe and receiving the water passing from the slots thereof, water discharge pipes connected to opposite sides of the barrel and one being of a shorter length than the other and terminating in a nozzle and the other including a goose neck shaped portion and having its free end extending to a distance beyond the nozzle of the other water discharge pipe, a nozzle connected with the water discharge pipe having the goose neck shaped portion, an auxiliary pipe of angle shape having one end rotatably connected with the last-named water discharge pipe adjacent the nozzle thereof, and a control valve connected with the auxiliary pipe for regulating the speed of rotation of the barrel and for stopping and starting the rotation of the barrel said auxiliary pipe when extending at right angles from the gooseneck pipe and in one direction causing the barrel to rotate in an opposite direction and said auxiliary pipe when extending in the opposite direction causing the barrel to rotate in an opposite direction.

FRED M. SPURLOCK.